Patented Apr. 6, 1943

2,315,988

UNITED STATES PATENT OFFICE 2,315,988

TREATMENT OF SULPHURIC ACID FOR REMOVAL OF NITROGEN OXIDES

Norman C. Somers, Carneys Point, N. J., and Walter Crews Woodings, Jr., Brandywine Hundred, Del., assignors to E. I. du Pont de Nemours & Company, Wilmington, Del., a corporation of Delaware No Drawing. Application October 8, 1940, Serial No. 360,226

3 Claims. (Cl. 23—172)

This invention relates to the purification of sulphuric acid and more particularly to the removal of nitrogen oxides from strong sulphuric acid by treatment with ferrous iron and subsequent blowing with a relatively inert gas.

It is known that reducing agents, such as sulphur dioxide, hydrogen sulphide, and sodium thiosulphate, reduce oxides of nitrogen in sulphuric acid, in acids less concentrated than 85%, and the nitric oxide so formed is evolved. In more concentrated acid, reduction with these agents is very incomplete. It is also known that nitrogen oxides may be removed from weaker suphuric acid by heating or stripping with steam, air, etc. In acids stronger than 85% the nitrogen oxides form non-volatile complexes with the sulphuric acid (such as nitrosyl sulphuric acid) which are so stable that they cannot be decomposed by heat or stripping.

The object of this invention is the removal of nitrogen oxides from sulphuric acid.

This object is accomplished by the following invention according to which the nitrogen oxides in sulphuric acid, mostly present as nitrosyl sulphuric acid, are reduced by ferrous iron, for example, ferrous sulphate, and form a complex $FeSO_4.NO$. The nitric oxide in this complex has a vapor pressure which, while far too low for the complex to decompose spontaneously, is still appreciable. The acid containing this complex is then blown with air or an inert gas until the nitric oxide is stripped out.

The following example illustrates the invention.

Example

To 100 parts by volume of 97% (by weight) sulphuric acid containing 0.019% sulphur dioxide and 0.014% nitrogen oxides (as $HNO_3$), were added 3 parts by volume of a saturated solution of ferrous sulphate in water (about 18 gm. $FeSO_4$ per 100 cc.). Air was then blown through the acid, using a distributor to give small bubbles. The acid was held at a temperature of 38° C. After 35 volumes of air per volume of acid had passed through, the acid was analyzed and found to contain less than 0.0003% nitrogen oxides as $HNO_3$ and 0.001% sulphur dioxide.

In another operation just like the above except that the acid was held at 75° C. during the blowing, 20 volumes of air reduced the amount of nitrogen oxides to less than 0.0003% as $HNO_3$.

Nitrogen oxides have been removed in tests in which the acid temperature during blowing was as low as 20° C. and as high as 100° C. It is found that the higher the temperature of the acid, the less air is needed to remove the nitric oxide.

The amount of air needed is also governed by the efficiency of contact of the air and acid. Many small bubbles are more effective than a few large ones.

It has also been found possible to strip out the nitric oxide from the ferrous sulphate treated acid in a packed column, allowing a stream of acid to trickle down against a rising stream of air.

Nitrogen, carbon dioxide, clean stack gas, and other inert gases may be used for blowing instead of air. Air is not entirely inert, but is sufficiently so to be considered a satisfactory equivalent of nitrogen.

The amount of ferrous sulphate needed is best determined empirically for several reasons. First, the nitrogen oxides are not all in the same state of oxidation, so that varying amounts of ferrous sulphate may be needed to reduce them all to NO and form the $FeSO_4.NO$ complex. Second, during air blowing, especially if there is a considerable depth of acid, some of the ferrous sulphate will be oxidized by the air so that an excess will be needed. Third, there may be some ferrous sulphate already present in the acid, although, in almost all commercial acids, what iron is present is in the ferric state, which is useless for this treatment. Fourth, some of the nitric oxide when stripped out by the air is also oxidized by the air to nitrogen dioxide which may then redissolve in the acid and require more ferrous sulphate to reduce it. Because of the low concentration of nitric oxide in the stripping air, this reoxidation is rather slow. Normally about 4–5 mols of $FeSO_4$ per mol of nitrogen oxide is sufficient for a treatment but an excess does no harm.

It is preferable to add the ferrous sulphate to the acid in the form of a saturated solution of ferrous sulphate in water or dilute sulphuric acid. However, it may be added as a dry powder or as wet crystals, in which cases the solid and acid should be stirred together vigorously for some time. It seems probable that the nitrogen oxides dissolved in the sulphuric acid can react with solid ferrous sulphate since the amount of ferrous sulphate added often exceeds its solubility in the strong acid. When added as a water or acid solution, the $FeSO_4$ is thrown out of solution in a finely divided form which appears to be quite reactive.

Ferrous ammonium sulphate and other ferrous salts may be used instead of ferrous sulphate, but the latter has the advantage of being cheap and and fairly pure, and not introducing foreign anions into the acid.

This invention has the advantage of producing sulphuric acid free from nitrogen oxides cheaply and simply, and with but little dilution. Incidentally, the acid so treated has its sulphur dioxide content reduced by the blowing. Acid so purified may be used in scrubbing gases and generating gases without introducing into them the oxides of nitrogen which are very corrosive and undesirable.

Resort may be had to such modifications and variations as fall within the spirit of the invention and the scope of the appended claims.

We claim:
1. A process of removing nitrogen oxides from concentrated sulphuric acid that contains at least 85% of sulphuric acid which comprises adding a ferrous salt to said sulphuric acid and then blowing with a relatively inert gas.
2. A process of removing nitrogen oxides from concentrated sulphuric acid that contains at least 85% of sulphuric acid which comprises adding ferrous sulphate thereto and then blowing with a relatively inert gas.
3. A process as defined in claim 2 in which the relatively inert gas is air.

NORMAN C. SOMERS.
WALTER CREWS WOODING, JR.